(12) United States Patent
Lorton et al.

(10) Patent No.: US 7,966,974 B2
(45) Date of Patent: Jun. 28, 2011

(54) APPARATUS FOR ENHANCING POULTRY PRODUCTION

(75) Inventors: Brad W. Lorton, Goshen, IN (US); Curtis R. Wenger, Goshen, IN (US)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 12/887,006

(22) Filed: Sep. 21, 2010

(65) Prior Publication Data

US 2011/0011350 A1    Jan. 20, 2011

Related U.S. Application Data

(60) Continuation of application No. 12/640,175, filed on Dec. 17, 2009, now Pat. No. 7,832,359, which is a division of application No. 11/999,241, filed on Dec. 4, 2007, now Pat. No. 7,658,165, which is a continuation of application No. 11/592,634, filed on Nov. 3, 2006, now abandoned, which is a continuation of application No. 10/663,294, filed on Sep. 16, 2003, now Pat. No. 7,156,051, which is a continuation of application No. 10/360,040, filed on Feb. 6, 2003, now Pat. No. 6,655,320, which is a continuation of application No. 10/072,433, filed on Feb. 8, 2002, now Pat. No. 6,705,251.

(60) Provisional application No. 60/267,912, filed on Feb. 9, 2001.

(51) Int. Cl.
    *A01K 31/18*    (2006.01)
(52) U.S. Cl. ........................................ 119/437
(58) Field of Classification Search .................. 119/436, 119/437, 448, 450
    See application file for complete search history.

(56) References Cited

U.S. PATENT DOCUMENTS

| 1,964,846 | A |   | 7/1934 | Earnshaw |         |
|-----------|---|---|--------|----------|---------|
| 4,224,900 | A |   | 9/1980 | Truhan   |         |
| 4,443,387 | A |   | 4/1984 | Gordon   |         |
| 4,462,334 | A | * | 7/1984 | Kim      | 119/436 |

(Continued)

FOREIGN PATENT DOCUMENTS

EP    0351310    1/1990

OTHER PUBLICATIONS

Non-Final Office Action, mailed Jun. 4, 2007, in related U.S. Appl. No. 11/592,634 (now abandoned).

(Continued)

*Primary Examiner* — Thomas Price
(74) *Attorney, Agent, or Firm* — Harness, Dickey

(57) ABSTRACT

An apparatus and method are described for raising poultry, such as chickens, for food production. A facility for housing the poultry includes a wall with at least one light-absorbing ventilation fan for ventilating the facility and a movable curtain covering a curtain opening. A controller operates the movable curtain to expose an interior of the facility to natural light cycles of an outside environment for a first period and regulating light cycles of the interior for a second period, thereby mimicking daylight duration variation representative of seasonal changes for stimulating sexual development of the poultry. Alternatively, the controller operates the movable curtain to limit exposure of an interior of the facility to light to produce a brown-out effect therein for enhancing physical development of the poultry. The light absorbing material of the fan facilitates the lighting effect achieved by the controller's operation of, for example, the movable curtain.

20 Claims, 3 Drawing Sheets

U.S. PATENT DOCUMENTS

| | | | |
|---|---|---|---|
| 4,721,062 A * | 1/1988 | Williams et al. | 119/437 |
| 4,930,446 A | 6/1990 | Huisinga | |
| 5,031,574 A * | 7/1991 | McDowell | 119/448 |
| 5,193,483 A * | 3/1993 | Crider et al. | 119/448 |
| 5,492,082 A * | 2/1996 | Krevinghaus et al. | 119/448 |
| 5,567,200 A * | 10/1996 | Swartzendruber | 454/338 |
| 5,911,195 A | 6/1999 | Tripp et al. | |
| 6,073,586 A * | 6/2000 | Medlin et al. | 119/437 |
| 6,182,610 B1 | 2/2001 | Tripp et al. | |
| 6,481,380 B1 * | 11/2002 | Barnett, Sr. | 119/437 |
| 6,655,320 B2 * | 12/2003 | Lorton et al. | 119/437 |
| 6,705,251 B2 | 3/2004 | Lorton et al. | |
| 7,156,051 B2 | 1/2007 | Lorton et al. | |
| 7,658,165 B2 | 2/2010 | Lorton et al. | |

OTHER PUBLICATIONS

Notice of Allowability, mailed Jul. 8, 2010, in parent U.S. Appl. No. 12/640,175.

* cited by examiner

APPARATUS FOR ENHANCING POULTRY PRODUCTION

CROSS-REFERENCE TO RELATED APPLICATIONS

This application is a continuation of U.S. application Ser. No. 12/640,175, filed Dec. 17, 2009, which is a divisional of U.S. application Ser. No. 11/999,241, filed Dec. 4, 2007, now U.S. Pat. No. 7,658,165, which is a continuation of U.S. application Ser. No. 11/592,634 filed Nov. 3, 2006, now abandoned; which is a continuation of U.S. application Ser. No. 10/663,294 filed Sep. 16, 2003, now U.S. Pat. No. 7,156,051; which is a continuation of U.S. application Ser. No. 10/360,040 filed Feb. 6, 2003, now U.S. Pat. No. 6,655,320; which is a continuation of U.S. application Ser. No. 10/072,433 filed on Feb. 8, 2002, now U.S. Pat. No. 6,705,251; which claims the benefit of priority of U.S. provisional application 60/267,912 filed Feb. 9, 2001.

FIELD

The present disclosure relates to methods of poultry production and more particularly to a method and apparatus for enhancing poultry production.

BACKGROUND

In various industries such as those involving agriculture, it is often necessary to circulate relatively large amounts of air through a building to help maintain the interior of the building within a desired temperature range, and to provide adequate ventilation. One such application where ventilation and control of the temperature within a building is extremely important is in connection with poultry houses. Such facilities are typically used to house chickens which are being grown for eventual slaughter or which are being used for egg production. Such facilities are also designed for manipulating the light that enters into the building. Light entering a poultry house may affect a chicken in two ways. Initially, the time frame by which a chicken becomes sexually mature is dependent upon the seasonal cycles the chicken experiences. Further, the psychological well being, and thus the physical development, of the chicken is affected by the quantity and concentration of light it is exposed to. Turkeys or other animals are also commonly kept in such houses, and may be equally as sensitive to light variation.

In a large scale poultry house, typically twenty thousand to twenty-five thousand chickens may be housed at a given time. If a poultry house is not properly ventilated, and the ambient temperature within it not properly controlled, the respiration of the chickens and the waste by-products within the poultry house can quickly give rise to a build up of ammonia and heat within the house which may be physiologically detrimental to the chickens. In extreme cases, such as where adequate ventilation and/or cooling is not provided on hot summer days, significant animal mortality may result. Even if mortality does not result, repeated lapses of proper ventilation and/or cooling can produce significant physiological stress on the chickens that results in inhibited growth, reduced egg production, and/or disease. Further, any concentrated areas of light shining into the poultry house will attract the chickens to that area, resulting in a crowd of chickens. This may be psychologically detrimental to the chickens, which further inhibits their physical development. Any of the above conditions may result in significant financial losses to a poultry farmer.

In cases where the chickens are used for egg production, the sexual development of the chickens is a key aspect for production. Generally, chickens sexually mature during the onset of spring. In this way, nature provides for the eggs to be laid during appropriate climate conditions to ensure the survival of the offspring. Mass production of eggs, however, occurs throughout the year. As a result, poultry farmers seek to manipulate the maturity cycles of the chicken to enable the chickens to produce eggs year around. Manipulation of the maturity cycles is generally achieved through controlling the length of day the chickens experience. Through implementation of a light regulation program within the poultry house, the chicken's body can be manipulated into sensing the arrival of spring, regardless of the actual season. Thus, the chicken's body prepares to lay eggs in the upcoming weeks. This process holds significant financial advantages for poultry farmers.

In either of the above described cases, regulation of the amount of light entering the poultry house is a key element to ensure efficient poultry farming. Traditional poultry houses include a variety of features to ensure proper cooling, ventilation and the like. Such features create the opportunity for light to shine through small gaps where the features are mounted. Further, some features are themselves translucent, enabling a degree of light to pass therethrough and into the poultry house. The light that passes into the poultry house is detrimental to the efficient farming of poultry for the reasons discussed above.

It is therefore desirable in the industry to provide an improved method and apparatus for poultry farming that eliminates the drawbacks resulting from light transmission into a poultry house.

SUMMARY

The present disclosure relates to a method and apparatus for enhancing poultry production through the regulation of light the poultry is exposed to. The method and apparatus of the present disclosure provides a poultry house for housing poultry therein. The poultry house further includes at least one exhaust fan for facilitating ventilation within the poultry house, wherein the exhaust fan can include light absorbing components for eliminating light transmitted into the poultry house. The method can further provide a light regulation scheme for enhancing the growth characteristics of the poultry within the poultry house.

In one embodiment of the present disclosure, the sexual maturity of poultry is manipulated by providing a poultry house having at least one exhaust fan, wherein the poultry house is essentially impervious to light. To achieve this, the exhaust fan includes light absorbing components thereby prohibiting light to transmit through the material. A light regulating scheme is implemented for manipulating the day/night schedule that the chicken perceives. This regulating scheme includes a length of time where it is completely dark within the poultry house (i.e. night). The light absorbing components of the exhaust fan facilitate complete darkness within the poultry house. In this manner, the length of day the chicken perceives may be manipulated to stimulate egg production.

In another embodiment of the present disclosure, the psychological balance of the poultry is achieved by providing a poultry house having at least one exhaust fan, wherein the poultry house is designed to produce a dimming or "brownout" effect during daylight hours. To achieve this, the exhaust fan can include light absorbent components thereby prohibiting light to transmit through the material. A light regulation scheme is implemented for regulating the intensity of light that the poultry experience throughout the day. Balanced, dimmed light effectively calms the poultry enabling their bodies to concentrate on proper development.

Accordingly, it is a general object of the present disclosure to provide a method for enhancing the production of poultry by regulating the light the poultry is exposed to during essential growth and developmental periods.

A further object of the present disclosure can be to provide a method and apparatus for manipulating the sexual maturity of poultry, year around, through implementation of a light regulating scheme. The quantity of eggs produced, and thus hatchlings born, by a group of poultry may be thereby enhanced providing significant financial gains for poultry farmers.

Yet another object of the present disclosure can be to provide a method and apparatus for psychologically balancing growing poultry through implementation of a light regulating scheme. Poultry that are not subject to psychological stress develop better, providing a better quantity and quality of meat. Again, significant financial gains may be realized by poultry farmers.

Further areas of applicability of the present disclosure will become apparent from the detailed description provided hereinafter. It should be understood that the detailed description and specific examples, while indicating specific embodiments of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

The following discussion of various embodiments of the present disclosure is merely exemplary in nature. Accordingly, this discussion in no way is intended to limit the scope of the disclosure, or the application of the disclosure.

Figure 1:
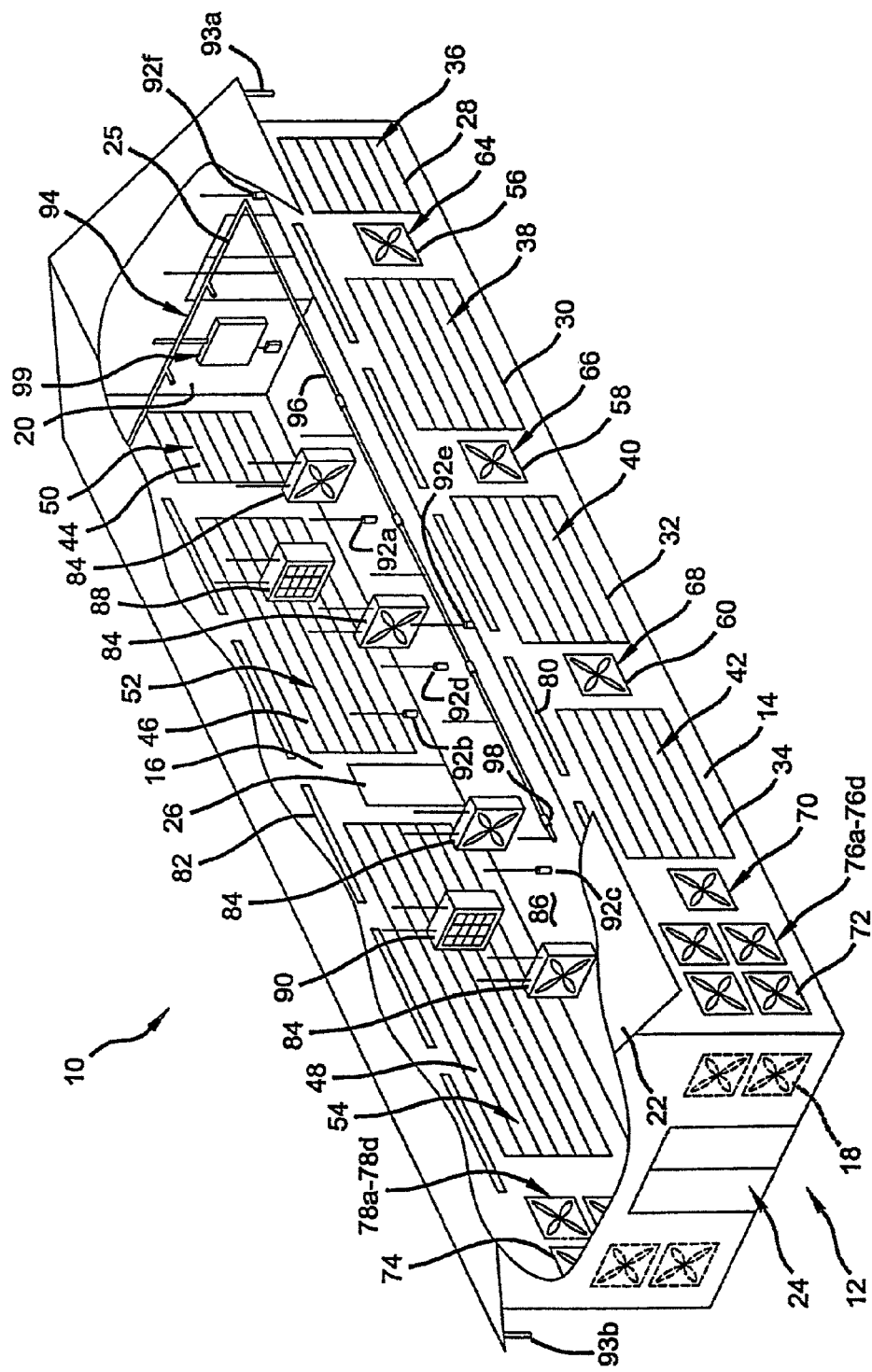
FIG. 1 is an elevational view of a structure in accordance with one embodiment of the present disclosure forming a poultry house, with a roof thereon, shown in broken-away form to illustrate various components within the poultry house not visible from the exterior thereof.

Referring to FIG. 1, an apparatus 10 is shown in accordance with one embodiment of the present disclosure. The apparatus 10 described herein is the subject of commonly assigned U.S. Pat. No. 5,492,082, which is hereby incorporated by reference. The apparatus 10 is used for providing a facility 12 for housing animals within a well ventilated and temperature controlled environment. The facility 12 may be used to house a wide variety of animals such as chickens, turkeys, hogs or virtually any other animal requiring a relatively controlled temperature and light environment for adequate growth or production of food such as eggs. While the following description of the various preferred methods and apparatus of the present disclosure will be directed principally with reference to chickens, this is in no way intended to limit the application of the disclosure to such animals. Those skilled in the art will appreciate that the facility 12 described herein is readily adaptable with little or no modification for use with a wide variety of animals which may be sensitive to significant variations in ambient temperature.

With further reference to FIG. 1, the facility 12 includes a pair of opposing side walls 14 and 16, a front wall 18, a rear wall 20, and a roof 22 shown in break-away form to illustrate the various components used therein to control ventilation, humidity, temperature and light within the confines of the facility 12. The side walls 14 and 16 may vary greatly in length but, for a large scale poultry house, are typically approximately 400 ft. in length. The front wall 18 and rear wall 20 may also vary significantly in length but are typically approximately 40 ft. in length for a large scale poultry house. The front wall 18 typically includes a plurality of doors 24 for allowing access to the interior of the facility 12. A side access door 26 is typically included in the side wall 16 preferably at about a mid-point of the length of the side wall 16. Optionally included is a door 25 in the rear wall 20.

The side wall 14 is typically about 8 ft.-10 ft. in height and includes a plurality of openings 28, 30, 32 and 34 over which motor-driven curtains are disposed. In the embodiment illustrated in FIG. 1, opening 28 may be covered completely by a tunnel curtain 36 disposed thereover which is adapted to be raised (i.e., opened) by a suitable electrically driven motor (not shown). Openings 30, 32 and 34 in the side wall 14 are each covered by a plurality of side wall curtains 38, 40 and 42 respectively. Each of the side wall curtains 38, 40 and 42 are capable of being controllably raised (i.e., opened) and lowered (i.e., closed) in conventional fashion by an electrically driven motor (not shown) associated therewith. It will be appreciated by those of ordinary skill in the art that the motors for each of the side wall curtains 38, 40 and 42 may be electrically coupled such that the side wall curtains 38, 40 and 42 will be raised and lowered simultaneously by an appropriate curtain controller (not shown). Such a controller is commercially available from the assignee of the present disclosure.

With further reference to FIG. 1, the side wall 16 also includes a plurality of openings 44, 46 and 48. The opening 44 has disposed thereover a second tunnel curtain 50 which, when fully lowered, completely covers the opening 44. The opening 46 has disposed thereover a side wall curtain 52 while the opening 48 is covered by a side wall curtain 54. It will be appreciated that each of the curtains 50, 52 and 54 is motor-driven, each having its own motor adapted to controllably raise and lower it in response to drive signals from a suitable curtain controller such as that mentioned above. As with the side wall curtains 38, 40 and 42, the side wall curtains 52 and 54 may be driven simultaneously between completely lowered and completely raised positions provided their respective motors (not shown) are electrically coupled so as to be driven by an independent curtain controller. Similarly, the motors associated with each of the tunnel curtains 36 and 50 may be controlled by an independent curtain controller such as mentioned above to cause both of the tunnel curtains 36 and 50 to be raised and lowered together substantially simultaneously. It is also anticipated that the motors for the side wall curtains 38, 40, 42, 52 and 54 may be controlled in various arrangements to cause substantially simultaneous opening and closing of various combinations of the side wall curtains.

With continued reference to FIG. 1, the side wall 14 includes a plurality of openings 56, 58, 60 and 62 within which are disposed side wall exhaust fans 64, 66, 68 and 70, respectively. Each of the side wall exhaust fans 64-70 is further oriented so as to exhaust air out of the interior of the facility 12.

Each of the side walls 14 and 16 include larger openings 72 and 74 positioned opposite each other. The opening 72 has mounted therein a plurality of exhaust fans 76a-76d and the opening 74 has mounted therein a plurality of exhaust fans 78a-78d. The exhaust fans 76a-76d and 78a-78d are oriented so as to draw air from inside the facility 12 and exhaust the air exteriorly with respect to the facility 12. It will be appreciated that while a plurality of four exhaust fans have been shown as disposed in each of the side walls 14 and 16, that one or more of the exhaust fans could optionally be disposed in suitable openings in the facility 12 as indicated in phantom in the drawing of FIG. 1. Alternatively, all of the exhaust fans 76a-76d and 78a-78d could be disposed in the front wall 18. The important consideration is that all of the exhaust fans 76a-76d and 78a-78d are disposed at an opposite end of the facility 12 from the tunnel curtains 36 and 50.

Figure 2:
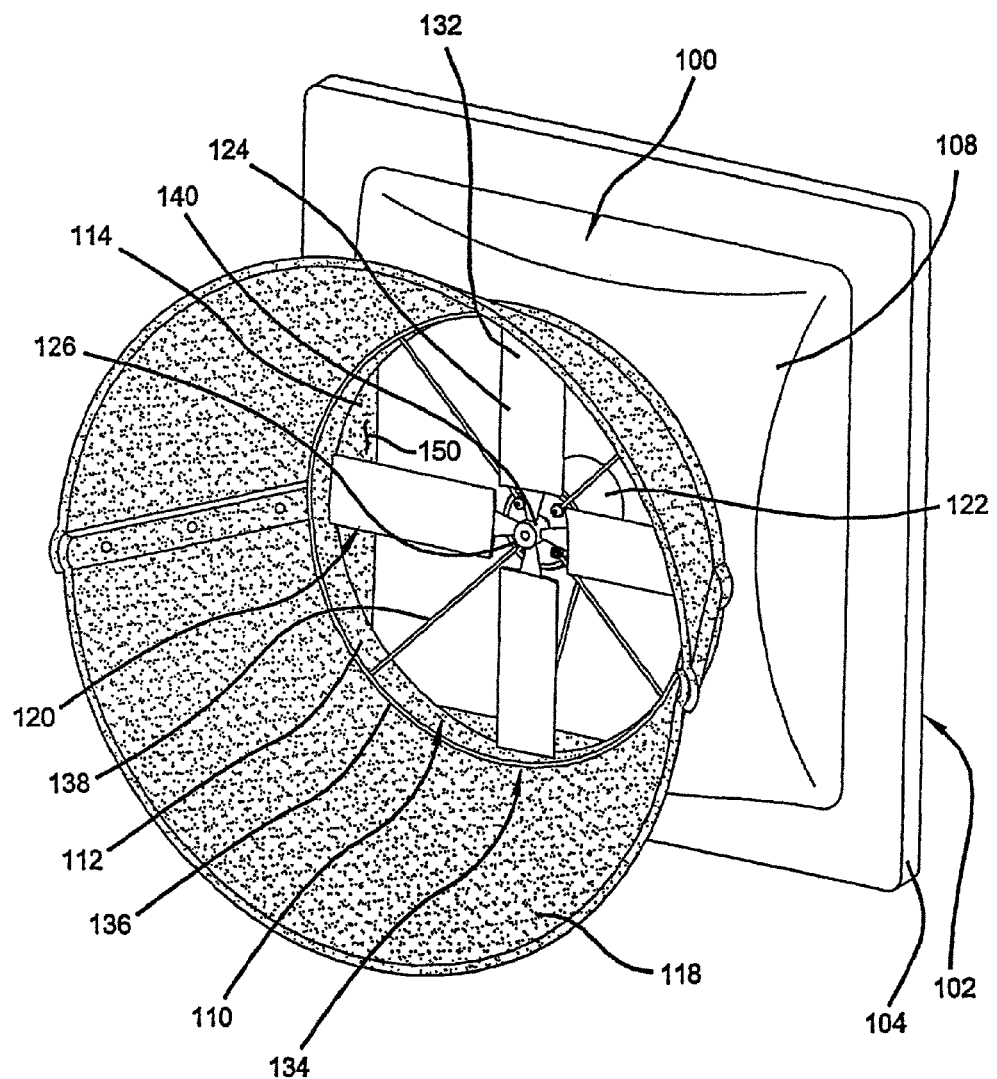
FIG. 2 is a perspective view of an apparatus for exhausting air from the poultry house of FIG. 1.
Figure 3:
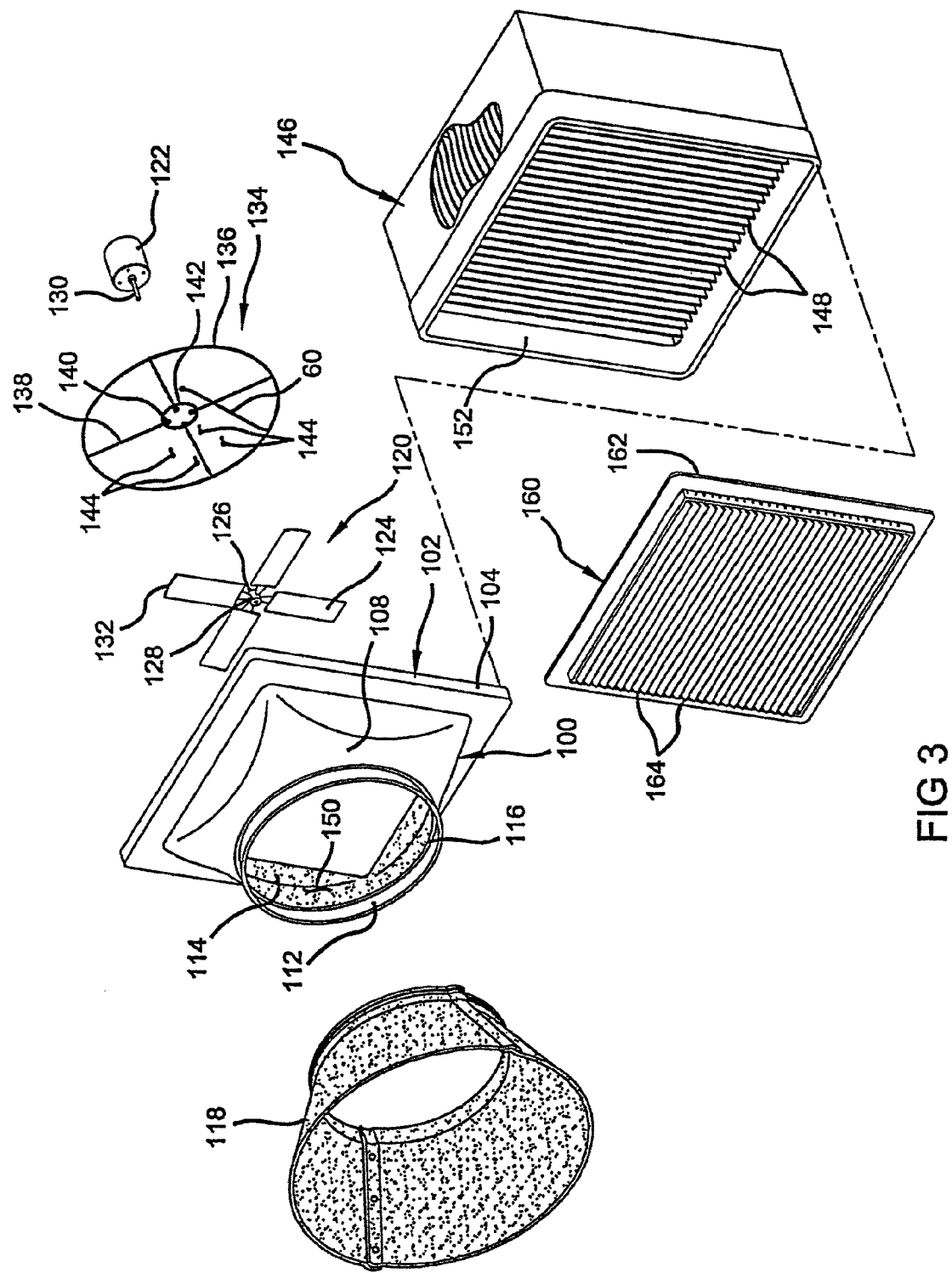
FIG. 3 is an exploded perspective view of the apparatus for exhausting air, shown in FIG. 2.

With reference to FIGS. 2 and 3, the exhaust fan construction will be described in detail. The exhaust fan described herein is generally that described in commonly assigned U.S. Pat. No. 5,567,200, which is hereby incorporated by reference, with modification. The exhaust fans each include a housing 100 that forms a flow path for air flowing through the exhaust fan. The housing 100 has a first end portion 102 that includes a generally rectangular flange 104. The flange 104 is operable to be mounted on the interior of the corresponding wall 14,16,18 of the facility 12, while the remainder of the housing 100 extends through the wall 14,16,18 to the exterior of the facility 12. The housing 100 further includes a generally conically shaped central portion 108 which serves to channel the flow of air between the interior of the facility 12 and a second end portion 110 of the housing 100. The second end portion 110 of the housing 100 includes an annular wall 112 which defines an opening 114 in the housing 100 and has a surface feature such as an annular groove 116. As will be more fully described below, the annular groove 116 is used to receive and position a motor mount within the housing 100.

The housing 100 may be made from any suitable material. Preferably, the housing 100 is fiberglass, however, it will be understood that any other suitable materials may be used including ABS, polyethylene, polypropylene, vinyls, nylons, metal and so forth. As will be discussed in further detail hereinbelow, the material selected should be of a type that holds its integrity after long term exposure to ultra-violet (UV) light. In addition, the thickness of the material forming the housing 100 may be relatively thin. In this regard, the thickness of the housing 100 may be approximately 0.125 inches when the diameter of the annular wall 112 is approximately 24 inches.

The housing 100 further includes a generally conically shaped cone 118 that mechanically communicates with the annular wall 112 of the housing 100. The cone 118 serves as a static regain cone which is used to improve the efficiency of the exhaust fan. The cone 118 may be rotomolded from a polymeric material such as polyethylene, however, other suitable materials may be used including ABS, polypropylene, vinyls, nylons, metal and so forth may also be used. As will be discussed in further detail hereinbelow, the material selected should be of a type that holds its integrity after long term exposure to ultra-violet (UV) light. Furthermore, it will be appreciated that the cone 118 may be of different shapes. For example, the cone 118 may be a blow-out cone in which the cone covers the opening 114 of the housing 100 when no air is flowing through the housing 100, and then swings open when air is driven through the housing 100. In such a case, the mountings for such a blow-out cone can be integrally formed in the housing 100. As will be appreciated by those skilled in the art, one purpose of such a blow-out cone is to prevent air from flowing into the facility 12 through the exhaust fan when the fan, which is described below, is not operating. In accordance with this embodiment of the present disclosure, a significant purpose of the cone 118 is to limit the amount of direct and indirect sunlight that would otherwise be able to shine through the exhaust fan.

The exhaust fan further includes a fan 120 as well as a motor 122 that is operable to drive the fan 120. The fan 120 includes a plurality of integrally formed blades 124 that are connected to the centrally located hub assembly 126. The hub assembly 126 includes an aperture 128 that is operable to receive the shaft 130 of the motor 122. Upon rotation of the shaft 130 of the motor 122, the fan 120 rotates so as to cause the blades 124 to drive air through the housing 100. Each of the blades 124 of the fan 124 includes an end portion 132 which is located in a spaced relationship with respect to the annular wall 112 of the housing 100 as will be more fully described below. In this regard, the end portions 132 of the blades 124 are within about 0.375 inches from the annular wall 112. As an alternative it is anticipated that the fan 120 may a belt-driven fan of a type commonly known in the art.

To provide means for mounting the motor 122 to the housing 100, the exhaust fan further comprises a motor mount 134. The motor mount 134 is operable to substantially maintain the spaced relationship between the annular wall 112 of the housing 100 and the end portions 132 of the blades 124 of the fan 120. This spaced relationship is maintained because movement of the annular wall 112 during operation of the fan 120 is restricted by the motor mount 134. The motor mount 134 comprises a generally first circular member 136 and a plurality of radial support members 138. The first circular member 136 is generally circular in cross-section and is operable to be disposed within the annular groove 116 of the housing 100. The radial support members 138 are preferably secured at approximately 90° intervals around the periphery of the first circular member 136 by a suitable means such as by welding. It will be understood, however, that the radial support members 138 may be secured at any suitable location around the periphery of the first circular member 136 so as to provide support for the motor 122. The radial support members 138 extend from the first circular member 136 radially inward and each terminate with circular mounting end portions 140.

Disposed proximate to the circular mounting end portions 140 is a second circular member 142. The second circular member 142 is secured to the radial support members 138 by suitable means such as by welding and serve to maintain a generally planar relationship between the radial support members 138 during operation of the exhaust fan. As those skilled in the art will appreciate, the second circular member 142 may be of any other suitable shape that is able to generally maintain a planar relationship between the radial support members 138.

When the motor 122 and fan 120 have been attached to the motor mount 134, the motor mount 134 is inserted into the housing 100 in such a manner that the first circular member 136 engages the annular groove 116 of the housing 100. It will be appreciated, however, that the motor mount 134 can also be inserted first into the housing 100 and then the motor 122 attached to the motor mount 134.

The assembly of the exhaust fans will now be described. The housing 100 is formed so as to define the generally annular wall 112 which is proximate to the end portions 132 of the blades 124. In addition, the housing 100 is formed so that the housing 100 has an internal surface contour which defines a surface feature such as the annular groove 112. It will be appreciated, however, that other types of surface features, such as a raised channel contour, may also be used.

The motor mount 134 is then formed by initially forming the substantially first circular member 136 and then forming the plurality of radial support members 138. The radial support members 138 are then secured to the first circular member 136 by a suitable means such as by welding. The motor 132 is then secured to the motor mount 134 by means of bolts 144 that extend through the circular mounting end portions 140 of the radial support members 138. The motor mount 134 is then inserted into the housing 100 so as to cause the motor mount 134 to engage the annular groove 112. It will be appreciated, however, that the motor mount 134 may also be initially secured to the housing 100, after which the motor 120 is secured to the motor mount 130.

A light trap 146 is optionally provided for eliminating direct light that would otherwise shine through the opening 114. The light trap 146 is of a type commonly available in the market and includes a plurality of contoured baffles 148 that allow airflow while prohibiting light to pass therethrough. The baffles are spaced apart from one another, thereby creating a plurality of gaps therebetween for enabling airflow. The contouring of the baffles 148, as seen in the cut-away portion of the light trap 146, bends the light as it travels through the gaps. The light is bent at least three times by the baffles 148, thereby prohibiting the light to travel completely through the light trap 146. The light trap further includes a frame piece 152 for mounting the light trap 146 directly to the housing 100 at the end portion 102. A more detailed description of the baffle plate 146 is forgone as the details of which are beyond the scope of the present disclosure.

A further option is the addition of a shutter 160 for selectively prohibiting the flow of air through the exhaust fan. The shutter 160 includes a frame 162, across which, a series of vanes 164 are pivotally supported. The shutter 160 is mounted to the exhaust fan, whereby the frame 162 is mounted to the housing 100. Further, the shutter 160 is preferably made from a plastic, including a gray resin. During periods of non-operation of the exhaust fan, the vanes 164 are closed, hanging downward from their pivot points with the frame 162 due to gravitational pull. In this manner, airflow is prohibited into the facility 12, through the exhaust fan. During periods of exhaust fan operation, a pressure difference occurs between the exhaust fan side (low pressure side) and the facility side (high pressure side) of the shutter 160, thereby causing the vanes 164 to pivot upward to an open position. With the vanes 164 in the open position, air flow is enabled through the exhaust fan. It is further anticipated that the shutter 160 is concurrently implemented with the light trap 146 described above. In this situation, the shutter 160 is mounted to the housing 100 and the light trap 146 is mounted to the facility side of the shutter 160.

Again referencing to FIG. 1, each of the side walls 14 and 16 further include a plurality of relatively thin, elongated openings 80 and 82, respectively. Preferably, the openings 80 and 82 are spaced along substantially the entire length of the side walls 14 and 16. The openings 80 and 82 are preferably relatively small in height, and more preferably about one-half inch in height. Optionally, the openings 80 and 82 may also include a slat or louver-like elements adapted to open in relation to the degree of static pressure drop within the facility 12 caused by the side wall exhaust fans 64-70. In this case the height of the louver-like assemblies may be four to six inches.

With further reference to FIG. 1 and turning now to the interior of the facility 12, several of the cooling and heating devices used to control temperature, humidity and ventilation therein can be seen. A plurality of fans 84, commonly known in the industry as "stir" fans, may optionally be included to provide an additional level of minimum air movement within the facility 12. The stir fans 84 preferably comprise 220 volt, one-half horsepower, 36" diameter fans and are preferably suspended from a truss or other similar structure supporting the roof 22 so as to be positioned relatively close to a floor 86 of the facility 12. More preferably, the fans are suspended so that the bottom of each is disposed generally between about 3 ft. to 5 ft. from the floor 86. Also suspended from the structure supporting the roof 22 is a pair of optional heaters 88 and 90. The heaters 88 and 90 are also suspended so as to place them preferably about two and one-half ft.—three ft. from the floor 86. It will be appreciated that typically a plurality of heaters greater than two will be included in the facility 12 to sufficiently warm the interior of the facility at various times. A plurality of temperature sensors in the form of thermistors 92a-92f are also suspended to preferably within about eighteen inches from the floor 86. An optional pair of temperature sensors 93a and 93b in the form of thermistors may also be suspended or otherwise mounted exteriorly of the facility 12, such as from a portion of the roof 22 or on one or more of the walls 14-20.

Optionally, an evaporative cooling system such as that generally known in the industry as a "fogger" 94 may be suspended from the structure supporting the roof 22. The optional fogger 94 shown in FIG. 1 includes 4 elongated, tubular water lines 96 (only one being shown), although it will be appreciated that a greater or lesser number of lines 96 could be used to suit the needs of specific applications. Each line 96 has a plurality of spaced apart nozzles 98 coupled in series in the line 96. Water is supplied to each of the lines 96 via a suitable pump and suitable electrically controlled valving which is well known in the art. The nozzles 98 each emit a very fine mist which also helps to cool the interior of the facility 12.

An electronic control system 99 is fixedly mounted on one of the walls 14-20 within the facility 12. The controller system 99 controls operation of the tunnel curtains 36, 50, the side wall curtains 38-42 and 52,54, the side wall exhaust fans 64-70, the tunnel fans 76a-76d and 78a-78d, the optional stir fans 84, the optional heaters 88, 90 and the optional fogger system 94. Additionally, the electronic control system 99 is electrically coupled to the indoor temperature sensors 92, as well as the external temperature sensors 93. This enables the controller system 99 to monitor the temperatures at various internal areas of the facility 12 as well as at one or more areas exterior of the facility 12.

This embodiment of the present disclosure provides a method for enhancing poultry production. According to the method of the present disclosure, a facility is provided, such as the facility 12 described hereinabove, for housing poultry. At least one exhaust fan, of the type described hereinabove, is further provided for enabling ventilation of the facility 12. The amount of light entering the facility 12 is regulated according to a predetermined schedule during a growth period of the poultry housed therein. In accordance with the present disclosure, efficient light regulation is assisted through the exhaust fans of the present disclosure, as described in further detail hereinbelow. The light regulation results in enhanced characteristics of the poultry thus, providing more efficient poultry production.

In accordance with a first alternative embodiment, the present disclosure provides a method for raising chickens to sexual maturity for enhancing egg production. In accordance with a second alternative embodiment, the present disclosure provides a method for raising chickens for more efficient production of desired meat portions. Each of the embodiments utilizes light regulation, as discussed above and described in further detail hereinbelow. In order to limit the amount of natural light that enters the facility 12 each potential opening of the facility 12 must be covered. Hence, the various curtains described herein function to close the corresponding openings. Further, any of the materials and components that comprise facility 12 must be made to be light absorbent, thereby prohibiting the transmission of natural light therethrough.

To achieve this, the exhaust fans of the present disclosure are manufactured to eliminate their transparency, thus prohibiting transmission of natural light therethrough. Accordingly, an inside surface 150 of the housing 100 of each exhaust fan is coated with a dark paint. The dark paint is preferably black in color, however, it is anticipated that other dark colors may be substituted therefore. Further, the dark paint is preferably gel-coat paint applied to the inside surface 150 in layers. Again, it is anticipated that other coating methods may be substituted therefore. Coating only a single side of the housing 100 provides cost savings, in both manufacture and material, over coating multiple sides of the housing 100. The cone 118 is manufactured from a dark polyethylene material. The material is preferably black in color, however, it is anticipated that another dark color may be substituted therefore. In this manner, the dark paint of the housing 100 and the dark cone 118 absorb light, thereby prohibiting the transmission of natural light through the otherwise partially translucent exhaust fans. Further, the cone 118 limits the amount of direct sunlight that would otherwise be able to shine through the exhaust fan.

In accordance with the first alternative embodiment of the present disclosure, the method of raising chickens to sexual maturity generally focuses on poultry raised to produce eggs. The physiological and sexual development of a chicken is a natural process that is a function of the length of day a chicken experiences. The method of the present disclosure accelerates this process by manipulating the day and night schedule the chicken experiences. In general, chickens are raised over a 21-week period in a facility, such as the facility 12. For the first two weeks, the chickens are given all of the natural light that normally shines into the facility 12. In this manner, the chickens are able to acclimate themselves to life in the facility 12, learning where food and water are available, where warmth is available and becoming accustomed to living sociably with the other chickens in the facility 12. Beginning in the third week and extending over the next eighteen weeks, a lighting program ensues whereby the light the chicken is exposed to gradually becomes longer. Initially, the lighting program limits the length of the "day" the chicken experiences, simulating winter days. Gradually, these "days" become longer, simulating the approach of spring. The gradually longer "days" cause the chicken's natural clock to anticipate the approach of spring, thus preparing the chicken sexually for laying eggs in "spring" (i.e. what the chicken's body thinks is spring). However, during the spring and summer months, the natural days are already longer. Therefore, in order for the chickens to experience a gradual lengthening of the day, and thus initiate sexual development, light entering the facility 12 must be restricted for a portion of the longer spring and summer days. Further, the light restriction must be to the point of complete darkness within the facility 12. To achieve this, each potential opening of the facility 12 must be light restricted, as discussed above. The dark components of the exhaust fans of the present disclosure, as well as the baffle plate 146, enable complete darkness to be achieved and therefore enable implementation of the lighting program in accordance with the method of the present disclosure.

In accordance with the second alternative embodiment of the present disclosure, the method of the present disclosure generally focuses on poultry raised to produce meat or eggs. Poultry raised for meat production are commonly referred to as "broilers" while poultry raised for egg production are commonly referred to as "layers". The psychological well being of the broiler plays an important role in the quality and quantity of meat the broiler produces. Similarly, the psychological well being of the layer plays an important role in the quantity of eggs the layer produces. In general, chickens that are uncomfortable or have other psychological difficulties with their environment do not eat, drink or thus grow, as well as desired, resulting in less efficient poultry production. A significant influence on the psychological well being of a chicken is the light the chicken is exposed to. For example, if an opening of the facility 12 is not properly light restricted and light shines into the facility 12 unabated, that light will be concentrated in a particular area. As a result, the chickens, which are attracted to the light, tend to congregate in a confined space, around the light. This crowd of chickens has a detrimental psychological effect on the chickens, thus inhibiting their physical development.

To alleviate the psychological stress a chicken may experience during its growth, the second preferred embodiment functions in a two-fold manner through the regulation of light into the facility 12. Due to the dark components of the exhaust fans of the present disclosure, light that would pass through the otherwise translucent exhaust fans is prohibited from entering the facility 12, thus avoiding light concentrations within the facility 12. In this manner, crowding of chickens in a confined space is avoided. Additionally, the limited light into the facility 12 creates a "brown-out" effect, dimming the overall light the chickens are exposed to. This has the effect of calming the chickens, making them more comfortable in the facility 12. In this manner, the psychological well being of the chickens is enhanced, further enhancing their physical development.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. An apparatus for raising poultry comprising:
    a wall defining an interior of a facility for housing the poultry;
    at least one curtain opening in the wall of the facility;
    a curtain movable into an open position permitting the passage of light through the curtain opening, and movable into a closed position restricting the passage of light through the curtain opening;
    at least one fan opening in the wall of the facility;
    a ventilation fan mounted in the at least one fan opening, the ventilation fan including a component coated with a light-absorbing coating; and
    a controller operably coupled to the ventilation fan and to the curtain and being configured to operate at least one of the ventilation fan and the curtain to limit the exposure of the interior of the facility to light to produce light cycles to mimic daylight duration variation representative of seasonal changes in the interior of the facility;
    wherein the inclusion of the light-absorbing coating on the component aids production of the light cycles to mimic daylight duration variation representative of seasonal changes in the interior of the facility.

2. The apparatus of claim 1, wherein the controller is further configured to operate at least one of the ventilation fan and the curtain to expose the interior of the facility to natural light cycles of an outside environment for a period.

3. The apparatus of claim 1, further comprising a climate control device, wherein the controller is coupled to the climate control device and configured to operate the climate control device to regulate an interior temperature of the facility.

4. The apparatus of claim 1, further comprising a static regain cone associated with the ventilation fan to aid in preventing undesirable transmission of light through the ventilation fan into the interior of the facility.

5. The apparatus of claim 1, further comprising a light trap associated with the ventilation fan to aid in preventing undesirable transmission of light through the ventilation fan into the interior of the facility.

6. An apparatus for raising poultry comprising:
- a wall defining an interior of a facility for housing the poultry;
- at least one curtain opening in the wall of the facility;
- a curtain movable into an open position permitting the passage of light through the curtain opening, and movable into a closed position restricting the passage of light through the curtain opening;
- at least one fan opening in the wall of the facility;
- a ventilation fan mounted in the at least one fan opening, the ventilation fan including a component coated with a light-absorbing coating; and
- a controller operably coupled to the ventilation fan and to the curtain and being configured to operate at least one of the ventilation fan and the curtain to limit the exposure of the interior of the facility to light to produce a brown-out lighting effect in the interior of the facility;
- wherein the inclusion of the light-absorbing coating on the component aids production of the brown-out lighting effect in the interior of the facility.

7. The apparatus of claim 6, wherein the controller is further configured to operate at least one of the ventilation fan and the curtain to expose the interior of the facility to natural light cycles of an outside environment for a period.

8. The apparatus of claim 6, further comprising a climate control device, wherein the controller is coupled to the climate control device and configured to operate the climate control device to regulate an interior temperature of the facility.

9. The apparatus of claim 6, further comprising a static regain cone associated with the ventilation fan to aid in preventing undesirable transmission of light through the ventilation fan into the interior of the facility.

10. The apparatus of claim 6, further comprising a light trap associated with the ventilation fan to aid in preventing undesirable transmission of light through the ventilation fan into the interior of the facility.

11. An apparatus for raising poultry comprising:
- a wall defining an interior of a facility for housing the poultry;
- at least one curtain opening in the wall of the facility;
- a curtain movable into an open position permitting the passage of light through the curtain opening, and movable into a closed position restricting the passage of light through the curtain opening;
- at least one fan opening in the wall of the facility;
- a ventilation fan mounted in the at least one fan opening, the ventilation fan including a component formed from a light-absorbing resin; and
- a controller operably coupled to the ventilation fan and to the curtain and being configured to operate at least one of the ventilation fan and the curtain to limit the exposure of the interior of the facility to light to produce light cycles to mimic daylight duration variation representative of seasonal changes in the interior of the facility;
- wherein the inclusion of the light-absorbing coating on the component aids production of the light cycles to mimic daylight duration variation representative of seasonal changes in the interior of the facility.

12. The apparatus of claim 11, wherein the controller is further configured to operate at least one of the ventilation fan and the curtain to expose the interior of the facility to natural light cycles of an outside environment for a period.

13. The apparatus of claim 11, further comprising a climate control device, wherein the controller is coupled to the climate control device and configured to operate the climate control device to regulate an interior temperature of the facility.

14. The apparatus of claim 11, further comprising a static regain cone associated with the ventilation fan to aid in preventing undesirable transmission of light through the ventilation fan into the interior of the facility.

15. The apparatus of claim 11, further comprising a light trap associated with the ventilation fan to aid in preventing undesirable transmission of light through the ventilation fan into the interior of the facility.

16. An apparatus for raising poultry comprising:
- a wall defining an interior of a facility for housing the poultry and at least one curtain opening in the wall of the facility,
- a curtain movable into an open position permitting the passage of light through the curtain opening, and movable into a closed position restricting the passage of light through the curtain opening; and
- at least one fan opening in the wall of the facility;
- a ventilation fan mounted in the at least one fan opening, the ventilation fan including a component formed from a light-absorbing resin;
- a controller operably coupled to the ventilation fan and to the curtain and being configured to operate at least one of the ventilation fan and the curtain to limit the exposure of the interior of the facility to light to light to produce a brown-out lighting effect in the interior of the facility;
- wherein the inclusion of the light-absorbing coating on the component aids production of the brown-out lighting effect in the interior of the facility.

17. The apparatus of claim 16, wherein the controller is further configured to operate at least one of the ventilation fan and the curtain to expose the interior of the facility to natural light cycles of an outside environment for a period.

18. The apparatus of claim 16, further comprising a climate control device, wherein the controller is coupled to the climate control device and configured to operate the climate control device to regulate an interior temperature of the facility.

19. The apparatus of claim 16, further comprising a static regain cone associated with the ventilation fan to aid in preventing undesirable transmission of light through the ventilation fan into the interior of the facility.

20. The apparatus of claim 16, further comprising a light trap associated with the ventilation fan to aid in preventing undesirable transmission of light through the ventilation fan into the interior of the facility.

* * * * *